(12) United States Patent
Brune et al.

(10) Patent No.: US 6,975,119 B2
(45) Date of Patent: Dec. 13, 2005

(54) BORING TOOL TRACKING/GUIDING SYSTEM AND METHOD WITH UNCONSTRAINED TARGET LOCATION GEOMETRY

(75) Inventors: Guenter W. Brune, Bellevue, WA (US); John E. Mercer, Kent, WA (US); Albert W. Chau, Woodinville, WA (US)

(73) Assignee: Merlin Technology, Inc., Renton, WA (US)

( * ) Notice: Subject to any disclaimer, the term of this patent is extended or adjusted under 35 U.S.C. 154(b) by 0 days.

(21) Appl. No.: 11/135,968

(22) Filed: May 24, 2005

(65) Prior Publication Data

US 2005/0212519 A1    Sep. 29, 2005

Related U.S. Application Data

(62) Division of application No. 10/971,662, filed on Oct. 22, 2004, now Pat. No. 6,917,202, which is a division of application No. 10/792,476, filed on Mar. 3, 2004, now Pat. No. 6,856,135, which is a division of application No. 10/001,854, filed on Nov. 20, 2001, now Pat. No. 6,727,704.

(51) Int. Cl.$^7$ .............................. G01V 3/08; E21B 7/00
(52) U.S. Cl. ........................................ 324/326; 175/45
(58) Field of Search ................................ 324/326–329, 324/345–346, 351–356, 364–369; 340/853.1, 340/853.3, 853.4, 853.5; 175/40, 45

(56) References Cited

U.S. PATENT DOCUMENTS

| | | | |
|---|---|---|---|
| 4,881,083 A | 11/1989 | Chau et al. |
| 5,155,442 A | 10/1992 | Mercer |
| 5,193,628 A | 3/1993 | Hill, III et al. |
| 5,920,194 A | 7/1999 | Lewis et al. |
| 6,005,532 A | 12/1999 | Ng |
| 6,191,585 B1 | 2/2001 | Mercer et al. |
| 6,250,402 B1 | 6/2001 | Brune et al. |

*Primary Examiner*—Bot LeDynh
(74) *Attorney, Agent, or Firm*—Michael Pritzkau

(57) ABSTRACT

Tracking a boring tool is performed within an underground region using a locating signal. The boring tool is moved through the ground during a series of distance movements such that potential movement of the boring tool during any one of the distance movements is less than a maximum movement value. A current positional relationship is determined for a current one of the distance movements based on: a last-determined positional relationship established for an immediately preceding one of the distance movements, certain orientation parameters, the maximum movement value and the determined signal strength of the locating signal in the current positional relationship. Target coordinates are accepted and a target position, based on the target coordinates, is included as part of the current positional relationship. The position of the target is unconstrained with respect to system geometry. Steering command features are provided along with steering warnings.

38 Claims, 3 Drawing Sheets

BORING TOOL TRACKING/GUIDING SYSTEM AND METHOD WITH UNCONSTRAINED TARGET LOCATION GEOMETRY

The present application is a divisional application of U.S. patent application Ser. No. 10/971,662, filed on Oct. 22, 2004, now U.S. Pat. No. 6,917,202; which is a divisional of application Ser. No. 10/792,476, filed on Mar. 3, 2004, and issued as U.S. Pat. No. 6,856,135 on Feb. 15, 2005; which is a divisional of application Ser. No. 10/001,854, filed on Nov. 20, 2001, and issued as U.S. Pat. No. 6,727,704 on Apr. 27, 2004; the disclosures of which are incorporated herein by reference.

BACKGROUND OF THE INVENTION

The present invention relates generally to the field of tracking and/or guiding a boring tool to an underground location using an electromagnetic locating signal and, more particularly, to a system and method which provides for guiding the boring tool to any selected location within an underground region. The target location is unconstrained with respect to any system component geometric arrangements so long as the receiving position is within a receiving range of the boring tool.

One early approach taken by the prior art in tracking a boring tool employs accelerometer and magnetometer sensors in the boring tool. Information is sent to an above ground display through the use of a cable to display pitch and yaw information. In one improvement, the pitch and yaw angles of the boring tool are integrated to estimate the position of the boring tool. It should be appreciated that boring tool position relative to a target is not available in this system. Moreover, accumulation of pitch and yaw measurement errors adversely influences the estimated boring tool position.

Another, more recent, approach taken in the prior art, with regard to guiding an in-ground boring tool, embodies a "homing" configuration. In such a configuration, the boring tool homes-in on a receiving position at which a receiver is located. Homing configurations are generally incapable of homing-in on anything other than the receiving position itself. That is, the target of the boring tool is necessarily limited to the position of the receiver. In one improvement, U.S. Pat. No. 4,881,083 (hereinafter the '083 patent) describes a homing configuration wherein the boring tool homes-in on a vertically oriented line extending through the receiver, in one embodiment, or homing in on the receiver itself, in another embodiment. In accordance with the former embodiment (see FIG. 1 of the '083 patent), the receiver is positionable above a pit for purposes of drilling to some previously underground point on the vertical line below the previous surface of the ground. The system, however, does nothing with respect to monitoring the depth of the boring tool. The depth of the boring tool must be independently established or controlled for the boring tool to properly emerge in the pit. In the latter embodiment (see FIG. 8 of the ('083 patent) and consistent with the prior art in general, the system is incapable of doing any thing other than homing on the receiving position. That is, no target other than the receiving position is possible.

A marked improvement over the general state of the prior art is described as one aspect of U.S. Pat. No. 6,250,402 (hereinafter the '402 patent) which is co-assigned with the present application and which is incorporated herein by reference. In contrast with the prior art, the '402 patent provides for steering a boring tool to specified depth target locations that are directly below the receiver (see FIG. 9 of the '402 patent). As described at column 27, lines 18–20 of the '402 patent, however, even this technique is limited in that the target may not be positioned beyond or in front of the receiver. It should also be appreciated that the target may not be positioned to the side (i.e., laterally displaced) of the receiver.

The present invention serves to remove the foregoing constraints with respect to the prior art while providing still further advantages, as will be described.

SUMMARY OF THE INVENTION

As will be described in more detail hereinafter, there are disclosed herein apparatus and an associated method for tracking and/or guiding a boring tool to a selected underground location.

In one aspect of the present invention, a system is described for tracking a boring tool within an underground region. In this system, the boring tool is configured for transmitting a dipole locating signal and the position of the boring tool is characterized, at least in part, by certain orientation parameters. From a first position, the boring tool is moved to a second position during a time interval. The first position forms part of a first positional relationship relative to a receiving position. With the boring tool at the second position, a signal strength of the locating signal is measured at the receiving position as well as the certain orientation parameters of the boring tool. A maximum movement value for the boring tool is established such that any potential movement of the boring tool over the time interval is less than the maximum movement value. Based on the first positional relationship, the certain orientation parameters, the maximum movement value and the determined signal strength of the locating signal at the second position, a second positional relationship is determined including the boring tool at the second position relative to the receiving position.

In another aspect of the present invention, target coordinates are obtained to which the boring tool is to be directed. In one feature, the target coordinates are specified by a user relative to the receiving position. A target position between determined relative to the boring tool.

In yet another aspect of the present invention, an intended path of the boring tool, extending between target and starting positions, may be longer than a dipole receiving range which defines a physical limit as to the potential distance between the boring tool and the locator, at or less than which limit the dipole locating signal is receivable by the locator. In one feature, the locator may be positioned laterally offset from the intended path. In another feature, a first position of the boring tool and a target location may be arranged to define the intended path as being approximately double the dipole receiving range.

In still another aspect of the present invention, steering commands are generated as part of a complete steering solution where desired pitch and yaw angles are specified for the boring tool at the target location in addition to the target coordinates.

In a further aspect of the present invention, a system for tracking a boring tool within an underground region is described, in which system the boring tool is configured for transmitting a dipole locating signal axially coincident with an elongation axis of the boring tool. A starting positional relationship is determined including the boring tool and a receiving position at which the dipole locating signal is to be monitored such that the receiving position is generally ahead of the boring tool. The boring tool is moved in a direction generally forward through the ground during a series of distance movements such that each distance movement is is less than a maximum movement value. For each distance movement making up a first sequence in the series of distance movements, at least measured values of the locating signal taken at the receiving position are used to determine a forward distance from the boring tool to an orthogonal plane defined normal to the elongation axis and including the receiving position. When, for a particular one of the first sequence of distance movements, the forward distance is determined to be less than the maximum movement value, the dipole locating signal is thereafter monitored during a second sequence in the series of the distance movements in a predetermined way which detects a specific one of the distance movements concluding the second sequence during which the boring tool crosses the plane.

In another aspect of the present invention, for each distance movementin a third sequence of the series of distance movements, monitoring of the dipole locating signal continues in the predetermined way for another crossing of the plane while a rearward distance is determined from the boring tool to the plane now located behind the boring tool. When the rearward distance determined following one of the distance movements concluding the third sequence is greater than the maximum movement value, for each distance movement making up a fourth sequence of the series of distance movements, at least measured values of the locating signal taken at the receiving position are used to confirm that the rearward distance is greater than the maximum movement value.

In an additional aspect of the present invention, a system is described for tracking a boring tool within an underground region, in which system the boring tool is configured for transmitting a dipole locating signal axially coincident with an elongation axis of the boring tool. A starting positional relationship is determined including the boring tool and a receiving position at which the dipole locating signal is to be monitored. The boring tool is moved through the ground during a series of distance movements such that each distance movement of the boring tool is less than a maximum movement value. For each distance movement, a current positional relationship is determined for a current one of the distance movements based on (i) a last-determined positional relationship established for an immediately preceding one of the distance movements, (ii) the certain orientation parameters, (iii) the maximum movement value and (iv) the determined signal strength of the locating signal in the current positional relationship. In one feature, target coordinates are accepted and a target position, based on the target coordinates, is included as part of the current positional relationship.

In a continuing aspect of the present invention, a system tracks a boring tool that is moved by a drill string within an underground region. Movement of the boring tool is characterized by certain orientation parameters including pitch and yaw and the system is configured at least for establishing the pitch and yaw orientation of the boring tool. Initially, a first pitch orientation and a first yaw orientation of the boring tool are determined corresponding to a first position of the boring tool. The boring tool is moved to a second position. A second pitch orientation and a second yaw orientation of the boring tool are determined for the second position as well as a distance between the first and second positions. Using the first and second pitch values, the first and second yaw values and the distance between the first and second positions, a curvature of the drill string is determined. In one feature, the first and second pitch values are used to determine a pitch angle increment and the first and second yaw values are used to determine a yaw angle increment. Thereafter, the pitch angle increment and the yaw angle increment are used, in combination, to establish an angular deflection of the drill string for use in determining the curvature of the drill string. In another feature, a ratio of the angular deflection to the distance between the first and second positions is used to determine the curvature of the drill string.

In another aspect of the present invention, a system tracks a boring tool that is configured for transmitting a dipole locating signal within an underground region where movement of the boring tool is characterized by certain orientation parameters including pitch and yaw. The system is configured at least for establishing the pitch and yaw orientations of the boring tool. Means is provided for accepting a target location to which the boring tool is to be guided including a target pitch orientation and a target roll orientation. Receiving means measures the locating signal at a receiving position. Processing means then generates steering commands for use in guiding the boring tool to the target location using (i) measured values of the locating signal taken at the receiving position by the receiving means, (ii) measurements of the pitch and yaw orientations of the boring tool, (iii) the target pitch orientation and (iv) the target yaw orientation. In one feature, the processing means is configured for generating the steering commands with the target position at least laterally offset with respect to the receiving position. In another feature, the processing means generates the steering commands by producing a horizontal steering command and a vertical steering command in a mathematically-coupled manner.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
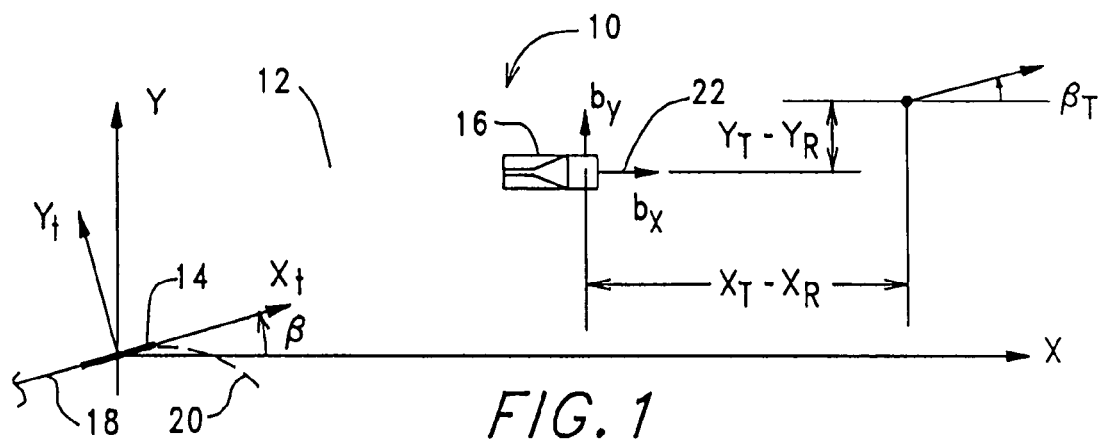
FIG. 1 is a diagrammatic plan view of a boring tool locating/tracking system produced in accordance with the present invention showing the arrangement of a boring tool and above ground locator.

Turning now to the figures wherein like components are indicated by like reference numbers throughout the various figures, attention is immediately directed to the plan view of FIG. 1 which illustrates a boring tool locating and steering system generally indicated by the reference numeral 10. System 10 is positioned in a region 12 and includes a boring tool 14 and a portable locator or receiver 16. While the latter is illustrated in the form of a portable locator, it is to be understood that any suitable form of receiver may be employed such as, for example, a detector designed to be operated from a generally fixed position. Such fixed position detectors are illustrated, for example, in the '402 patent discussed previously. For purposes of this disclosure, boring tool 14 may be referred to interchangeably as a steering tool or as a transmitter. A drill string 18 is partially illustrated as a dashed line which extends to a drill rig that is not shown. While the drill rig may be configured for moving the steering tool by means of the drill string in a conventional manner, it is to be understood that portions of system 10 such as, for example, processing arrangements and steering apparatus are readily locatable at the drill rig. Such modifications and configurations have not been illustrated for purposes of brevity but are nonetheless considered as being within the capabilities of one having ordinary skill in the art in view of this overall disclosure.

Still referring to FIG. 1, boring tool 14 includes a mono-axial antenna (not shown) such as a dipole antenna oriented along an elongation axis of the boring tool and which is driven to emit a dipole magnetic locating signal 20 (only one flux line of which is partially shown). As an example of a boring tool incorporating such a mono-axial antenna in its transmitter arrangement, see FIG. 9 of U.S. Pat. No. 5,155,442 and its associated description. This latter patent is co-assigned with the present application and hereby incorporated by reference. Inasmuch as determinations made by the present invention are based, at least in part, on the orientation of the boring tool, the latter is equipped with triaxial clusters of accelerometers and magnetometers configured to measure pitch, roll and yaw (azimuth) orientation angles of the boring tool along three orthogonally opposed axes. One such triaxial accelerometer/magnetometer configuration forms part of a composite magnetic signal detection arrangement described in U.S. Pat. No. 6,191,585 which is commonly assigned with the present application and is hereby incorporated by reference. Transmission of these parameters to locator 14 or to another location, such as the drill rig, is known in the art. For example, data may be encoded on the locating signal itself for transmission.

Considering locator 16, while desirable it is not an absolute necessity to configure the locator with a built-in magnetometer for ease of determination of the direction in which the locator is pointed, as will be further discussed. Moreover, locator 16 should include tilt sensors and associated data processing equipment to rotate measured antenna fluxes to level coordinates. Alternatively, the locator should be leveled or its tilt angles measured in a suitable manner. The locator receives the locating signal, as well as any encoded data, using a triaxial antenna cluster for reception along three orthogonally opposed axes. One highly advantageous triaxial antenna cluster is described in U.S. Pat. No. 6,005,532 which is commonly assigned with the present application and is incorporated herein by reference. As one component of system 10, either locator 16 itself or a remote unit (not shown), should be equipped with data processing capability sufficiently powerful to compute steering parameters and/or display graphics.

Having described system 10 from a hardware standpoint, attention is now directed to operational use of the system. The applicable procedure for determining the reference direction 22 depends on whether or not locator 16 features a magnetometer. If the locator is equipped with such a device, the locator may be placed on the ground, pointed in a reference direction 22, shown corresponding to the elongation axis of the locator in FIG. 1. While shown as being parallel to the drilling direction, it is to be understood that this is not a requirement. The selection of the reference direction is as easy as aiming the locator away from the drill rig in what is generally thought to be the drilling direction. Further, this process is initiated with the locator ahead of the boring tool with respect to what is thought to be the general drilling direction. This latter constraint is easily satisfied within the typical process of performing system setup prior to the actual start of drilling. It is noted that the locator may be laterally offset from the actual forward direction of the boring tool, as illustrated. This procedure allows the user to specify a very general reference direction. In instances where the receiver does not feature a magnetometer, the initial direction of the steering tool can be used to define the reference direction. The preferred approach is to place the steering tool on the ground ahead of the drill before drilling begins and to record its angle with respect to magnetic north of the Earth thereby defining the reference direction. This procedure is expected to be more accurate than using the direction of the boring tool at drill begin where the close proximity of the drill string might distort the flux lines emitted by the boring tool.

Figure 2:
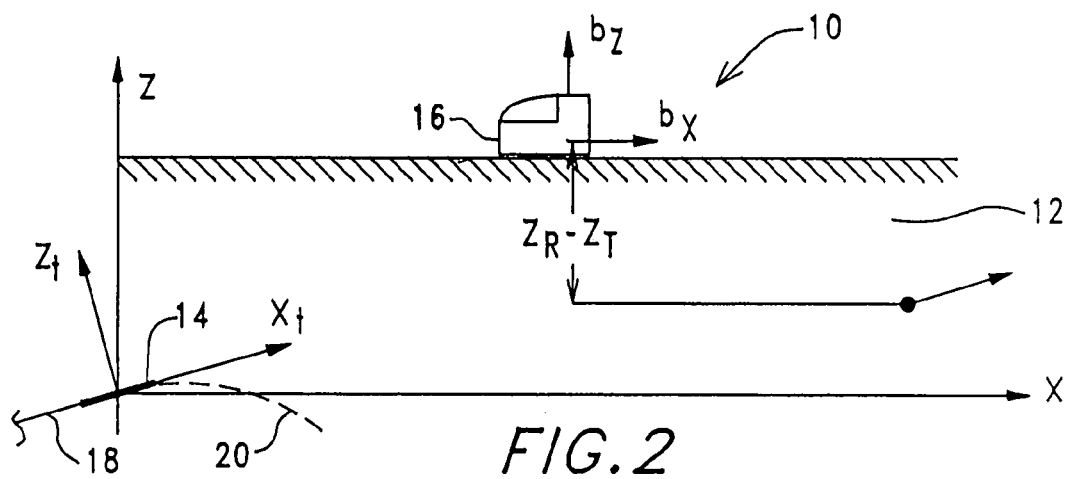
FIG. 2 is a diagrammatic elevational view of the system of FIG. 1, shown here to illustrate further details with regard to the arrangement of the locator and boring tool.
Figure 3:
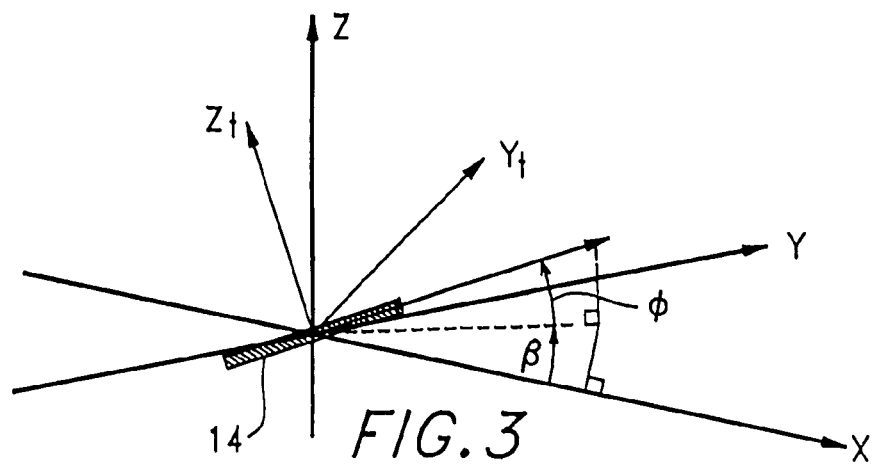
FIG. 3 is an enlarged diagrammatic view, in perspective, of the boring tool of FIGS. 1 and 2, shown here to illustrate a global coordinate system, a transmitter fixed coordinate system and several angular values related thereto as used by the present invention.

Referring to FIGS. 2 and 3 in conjunction with FIG. 1, system 10 operates within a global coordinate system having its origin defined to be at the center of the transmitter (i.e., the center of the antenna). That is, the global coordinate system origin corresponds to the origin of dipole locating signal 20. A global x-coordinate axis, indicated as x, points in the reference direction is established during setup. For convenience, a number of variables are listed in Table 1 with an associated description of each variable. FIG. 1 further illustrates a global y coordinate axis extending horizontally and orthogonal to the x axis while FIG. 2 illustrates region 12 in elevation including a global z coordinate axis extending vertically perpendicular to the global x,y plane. FIG. 3 is an enlarged elevational view of boring tool 14 showing selected axes which make up both global and transmitter fixed coordinates, as will be further described.

TABLE 1

| Variable Name | Description of Variables |
| --- | --- |
| x, y, z | Coordinates of a global system with origin at the center of the transmitter, x points in the reference direction of the transmitter, x, y are defined in a level plane, and z is defined positive upward. |
| $x_t, y_t, z_t$ | Transmitter fixed coordinates where $x_t$ is along the transmitter axis, $y_t$ normal to the transmitter axis, and $z_t$ such that a right handed coordinate system is formed. Note transmitter coordinates do not rotate when the transmitter is spinning about its axis but move when the transmitter is pitched and yawed. For zero pitch and yaw coordinates x, y, z and $x_t, y_t, z_t$ are identical. |
| $b_x, b_y, b_z$ | Measured components of flux in global coordinates at the center of the receiver antenna cluster. Note fluxes are for unit transmitter dipole strength. |

TABLE 1-continued

| Variable Name | Description of Variables |
|---|---|
| $x_R$, $y_R$, $z_R$ | Receiver coordinates in the global system. Note these are coordinates of the center of the antenna cluster. |
| $x_T$, $y_T$, $z_T$ | Target coordinates in the global coordinate system. |
| $b_{xT}$, $b_{yT}$, $b_{zT}$ | Fluxes at the target in global coordinates. |
| $\beta$ | Transmitter yaw angle defined in the global x, y plane. |
| $\beta_T$ | Transmitter yaw angle at target, user specified. |
| $\phi$ | Transmitter pitch angle defined in a plane normal to the global x, y - plane, positive up as seen in FIG. -3 |
| $\phi_T$ | Transmitter pitch angle at the target, user specified. |
| $\delta Y$, $\delta Z$ | Steering commands, used as position coordinates for the steering indicator symbol seen in FIG. 8. |

Continuing to refer to FIGS. 1–3, receiving coordinates in the global system are determined by solving the known magnetic dipole equations in order to develop a positional relationship between the receiving position of the locator and the boring tool. This step requires the use of measured fluxes for unit transmitter dipole strength, transmitter pitch and yaw. Measured fluxes $b_x$, $b_y$, $b_z$ are transformed from global to transmitter fixed coordinates using:

$$\begin{Bmatrix} b_{x_t} \\ b_{y_t} \\ b_{z_t} \end{Bmatrix} = T_2 T_1 \begin{Bmatrix} b_x \\ b_y \\ b_z \end{Bmatrix} \text{ with} \quad (1)$$

$$T_1 = \begin{Bmatrix} \cos\beta & \sin\beta & 0 \\ -\sin\beta & \cos\beta & 0 \\ 0 & 0 & 1 \end{Bmatrix} \quad (2)$$

$$T_2 = \begin{Bmatrix} \cos\phi & 0 & \sin\phi \\ 0 & 1 & 0 \\ -\sin\phi & 0 & \cos\phi \end{Bmatrix} \quad (3)$$

It is appropriate at this juncture to note that global coordinates differ from transmitter fixed coordinates only with respect to the pitch and yaw angles of the boring tool. That is, transformation from one coordinate system to the other requires two rotations. If the boring tool is at zero pitch and yaw, the two coordinate systems coincide exactly. FIGS. 1 and 2 illustrate the transmitter fixed coordinate axes yawed (the $x_t$, $y_t$ plane rotated about the z axis) and pitched (the $x_t$, $z_t$ plane rotated about the $y_t$ axis), respectively, when compared to the global coordinate axes. In this regard, it is noted that the word "global" merely references an invariability of the global coordinate system over the entirety of the drilling region. In the expressions of equations 1–3, $T_1$ and $T_2$ represent rotation matrices wherein $T_1$ is associated with the yaw rotation and $T_2$ is associated with the pitch rotation. The remaining variables are as defined in Table 1.

Figure 4:
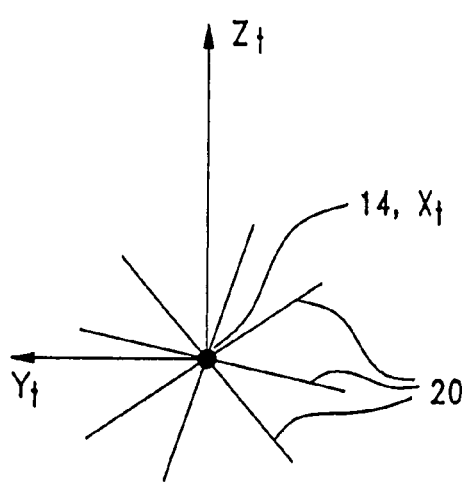
FIG. 4 is diagrammatic elevational end view of the boring tool of FIGS. 1–3 showing the transmitter fixed coordinate system in relation to a number of flux lines of the locating signal emitted by the boring tool.
Figure 5:
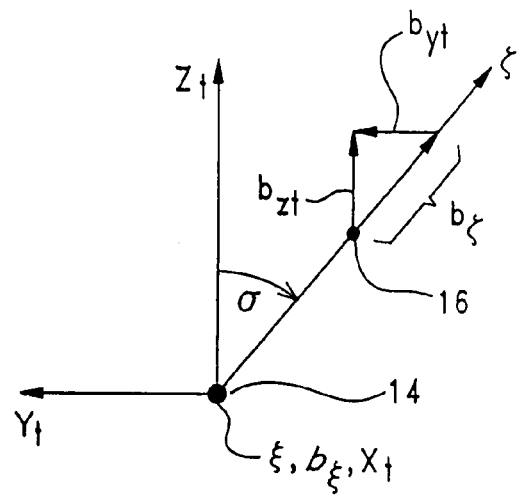
FIG. 5 is another diagrammatic elevational end view of the boring tool of FIGS. 1–3 further showing an edge view of a flux plane used in characterizing the locating signal in polar coordinates.

Turning now to FIGS. 4 and 5, the former is an end view of boring tool 14 showing flux lines of dipole locating field 20 extending radially outward from the boring tool. The latter figure is an end view of boring tool 14, looking forward from behind the boring tool, illustrating the transmitter fixed coordinate axes relative to other parameters to be described. The flux of the dipole locating signal is transformed to an $\xi,\zeta$ plane defined including the elongation axis of the boring tool as well as the center of the receiver antenna cluster and having an origin coincident with the origin of the dipole locating signal. That is, a $\xi$ axis is coincident with the elongation axis of the boring tool and, likewise, the $x_t$ axis while a $\zeta$ axis extends orthogonal to the $\xi$ axis in a direction which positions locator 16, which is diagrammatically indicated as a point, in the $\xi,\zeta$ plane. This arrangement serves to simplify calculation of locator coordinates since the flux-line pattern of a magnetic dipole is axi-symmetric and, therefore, a total flux vector measured by the receiver is contained in the $\xi,\zeta$ plane. A rotation angle $\sigma$ is defined, as shown in FIG. 5, between the $z_t$ and the $\zeta$ axes. The component of intensity of the locating signal that is oriented along the $\zeta$ axis is indicated as $b_\zeta$. This latter flux intensity is projected onto the $y_t$ and $z_t$ axes as components $b_{y_t}$ and $b_{z_t}$, respectively.

Referring to FIG. 5, the rotation angle $\sigma$ follows from:

$$\tan\sigma = \frac{-b_{y_t}}{b_{z_t}} \quad (4)$$

It is noted that equation 4 is not defined if $b_{y_t} = b_{z_t} = 0$. There are 3 positions of the locator with respect to the boring tool for which this is the case, requiring a different approach to calculating locator coordinates. One such case arises when locator 16 is on the locate line. In the other cases the boring tool is either pointing to the center of locator 16 or away from it. In this regard, one characteristic of a dipole magnetic field is a locate line that is defined on a level ground surface at zero transmitter pitch wherein the magnetic flux lines bisecting a plane orthogonal to the elongation axis of the boring tool transmitter and containing the origin of the dipole locating signal are parallel to the elongation axis of the boring tool at the orthogonal plane as well as being horizontal relative to the level ground surface. Hence, passing the locate line during steering may momentarily produce ambiguous results. Because the locate line is always contained in the orthogonal plane to the axis of the transmitter, the locate line, therefore, shifts in position on the ground surface with changes in transmitter pitch. When the boring tool is pitched, the point at which $b_{y_t} = b_{z_t} = 0$ shifts is in direct proportion to the pitch.

Figure 6:
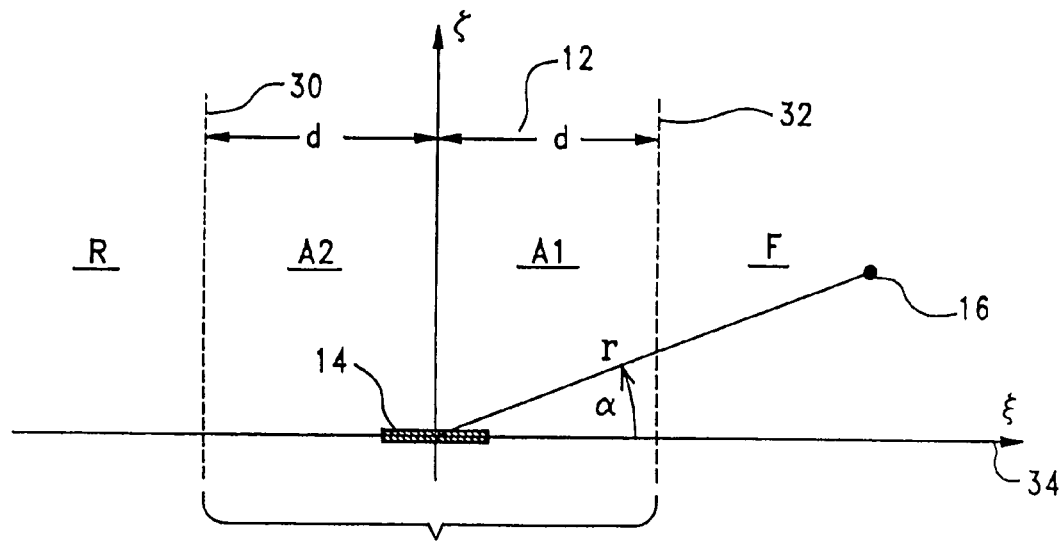
FIG. 6 is a diagrammatic elevational view of the boring tool, shown here to illustrate a number of tracking regions used in a highly advantageous way by the present invention for empirically monitoring progress of the boring tool irrespective of certain ambiguities seen in the locating signal emitted from the boring tool.

Referring to FIG. 6 which is a view of the $\xi,\zeta$ plane taken normal thereto and FIG. 5, components of flux in the $\xi, \zeta$ plane are determined as:

$$b_\xi = b_{x_t}, \text{ and} \quad (5)$$

$$b_\zeta = b_{z_t} \cos\sigma - b_{y_t} \sin\sigma \quad (6)$$

FIG. 6 further illustrates determination of the receiver coordinates performed in polar r,$\alpha$ coordinates in the $\xi,\zeta$ plane wherein a radius r extends from the origin to the position of locator/receiver 16 which is illustrated as a dot. It should be appreciated that this position is, in fact, the center of the antenna array used to detect the locating signal. An angle $\alpha$ is formed between the $\xi$ axis and r. Accordingly, the polar coordinates are determined by:

$$\xi_R = r \cos\alpha \quad (7)$$

$$\zeta_R = r \sin\alpha \quad (8)$$

where radius r is obtained using:

$$\frac{1}{r^3} = -\frac{1}{4}b_\xi + \sqrt{\frac{9}{16}b_\xi^2 + \frac{1}{2}b_\zeta^2} \quad (9)$$

With regard to these determinations in the $\xi,\zeta$ plane, it is important to note that the dipole field has fore and aft symmetry so that fluxes alone do not uniquely define angle α. Accordingly, the present invention introduces a highly advantageous technique for establishing an unambiguous position of the steering tool with respect to the receiver. This technique utilizes known information and, more specifically, tracks the relative positional relationship between the boring tool and the locator based on a "last-determined" positional relationship which encompasses the most recent information available with respect to the relative positional relationship.

Referring again to FIGS. 5 and 6, the present invention employs an empirical tracking technique within an overall process for monitoring the relative position between boring tool 14 and locator 16. The empirical tracking technique of the present invention monitors this relative positional relationship by establishing three tracking regions referenced to a current position of the boring tool and its elongation axis. Specifically, these tracking regions are indicated by the letters F, A and R designated in FIG. 6. Region A is defined extending upwardly from, but does not include the ξ axis and extends laterally between first and second tracking boundaries 30 and 32, respectively, each of which is located at a distance "d" from the ζ axis oriented normal to the ξ axis. Region A is further designated as A1 ahead of the boring tool up to boundary 32 and A2 behind the boring tool up to boundary 30. The forward direction of boring tool 14 is indicated by an arrowhead 34 on the ξ axis. Specific considerations for establishing distance d will be described at an appropriate point below.

It should be mentioned that the empirical tracking technique of the present invention has been developed under the constraint that the locator position is above the boring tool in the ξ,ζ plane as viewed in FIG. 6 for all of the FAR tracking regions. This constraint, however, imposes no limitation on the actual positional relationship which may exist between the boring tool and locator since angle α, shown in FIG. 5, may vary over a full 360°. Any apparent limitation imposed by the ξ axis boundaries of the FAR tracking regions is compensated for by the full angular orientation capability of σ. In this regard, it is to be understood that the direction which appears as upward in FIG. 6 is, in terms of actual directional orientation, unlimited as defined by σ.

With continuing reference to FIG. 6, tracking region F extends forward from tracking boundary 32 while tracking region R extends to the rear of boring tool 14 from first tracking boundary 30. Initially, this empirical aspect of the tracking process of the invention relies on at least a limited knowledge of the starting positional arrangement between the boring tool and the locator. In particular, the initial position of the locator must be specified as ahead of or behind the boring tool. Within the context of initial setup, this requirement is easily satisfied since, in most instances, the locator is readily stationed ahead of the boring tool in the general direction of drilling prior to any actual drilling. Having established this initial positional arrangement, system 10 automatically tracks the progress of boring tool 14 relative to locator 16, as will be further described.

With regard to establishing distance d, it is first important to understand that the empirical tracking technique of the present invention monitors the relative positional relationship in an incremental fashion. That is, tracking proceeds by considering changes in the relative positional relationship over a series of distance movements. Distance d is an empirical quantity chosen such that it is impossible for the steering tool to move more than a distance d during a single one of the distance movements. Several advantages arise in view of these empirical constraints. First, the relative position of locator 16 cannot move from tracking region F to tracking region R in one distance movement (i.e., from one incremental position determination to the next successive one). In fact, the relative movement must be fully within region A for at least one distance movement. Second, as the boring tool incrementally approaches the locator within distance d of second tracking boundary 32, the locator will at least initially be found to be within tracking region A1 ahead of the boring tool (i.e., ahead of the ζ axis).

Referring to Table 2 in conjunction with FIG. 6, determining a new or subsequent relative positional relationship is performed at the conclusion of each distance movement in a predetermined way based in part on the aforedescribed constrained incremental changes possible in the positional relationship with respect to the FAR tracking regions. Another input is provided by the last-determined positional relationship. Specifically, the determination of any subsequent positional relationship relies on which one of the regions of FIG. 6 contained the receiving position at the time of the last-determined positional relationship. For this purpose, the last-determined position is established as one of tracking region F (Table 2, Row 1), tracking region R (Table 2, Row 5), tracking region A1 (Table 2, Row 2) ahead of the boring tool or tracking region A2 (Table 2, Row 4) behind the boring tool. The special case of the locator being on the ζ axis is shown in Table 2, Row 3. With regard to these various regions, it should be remembered that the regions move with the boring tool. Therefore, the locator position appears to move through the regions relative to the boring tool even though it is the boring tool itself that is actually moving.

TABLE 2

| Row # | Region | Flux $b_\zeta$ | Angular Expression | Equation |
| --- | --- | --- | --- | --- |
| 1 | F | $b_\zeta \leq 0$, $b_\zeta \leq 0$ | α | $\tan \alpha = F_1$ |
| 2 | A1 | $b_{70} > 0$ | αa | $\tan \alpha = F_1$ |
| 3 | ζ axis | $b_\zeta = 0$ | α = +90° | — |
| 4 | A2 | $b_{70} < 0$ | α = γ + 180° | $\tan \gamma = F_1$ |
| 5 | R | $b_{70} \leq 0$, $b_{70} \geq 0$ | α = γ + 180° | $\tan \gamma = F_1$ |

The use of Table 2 will now be described in the context of the typical locating situation in which the locator is initially ahead of the boring tool by more than distance d and then passes the locator along a relatively straight intended path that extends more than distance d past the locator, as orthogonally projected onto the intended path.

The expression F1, in Table 2 is given as:

$$F_1 = \frac{(-3b_\xi + \sqrt{9b_\xi^2 + 8b_\zeta^2})\,\text{sign}(b_\zeta)}{2|b_\zeta|} \quad (10)$$

Accordingly, the locator is initially in the F tracking region such that row 1 of Table 2 is used wherein $\tan \alpha = F_1$. Radial distance r is determined using equation 9. Knowing the locator position in polar coordinates, equations 7 and 8 may be used to determine the locator coordinates in the ξ,ζ plane. It should be appreciated that the boring tool may move toward the locator a number of times over a first sequence of distance movements (each having a magnitude less than d) while still remaining in tracking region F. For each of these movements which make up the first sequence, the relative positional relationship is determined using Row 1 of Table 2. Prior to determining the subsequent positional relationship associated with any distance movement, the last-determined positional relationship must confirm that the locator is still in region F. That is, the distance along the $\xi$ axis must be greater than distance d.

With regard to "incremental" movement of the boring tool during successive ones of the distance movements, it is to be understood that determinations of the tracking region in which the locator is positioned may be made "on the fly" in a manner that is essentially invisible to both the locator operator and drill rig operator. There is no need to actually incrementally move the boring tool corresponding to individual ones of the distance movements.

Still referring to FIG. 6 and Table 2, whenever the distance along the $\xi$ axis is determined to be less than distance d, the first sequence is terminated and a second sequence of distance movements is initiated during which the locator position progresses through region A1 with incremental movement of the boring tool. During the second sequence, it is important to monitor the flux of the locating signal in a way which establishes movement of the boring tool, in either of the fore and aft directions, with respect to the position of the locator crossing the $\zeta$ axis. This condition may be referred to more simply as the boring tool "passing" the locator in either the forward or reverse directions. If, at any time, the distance along the $\xi$ axis returns to a value that is greater than d, the procedure of the first sequence is recentered.

The locating signal flux may be monitored in a number of different ways in order to detect the boring tool passing the locator. In one approach, the locating signal flux $b_\xi$, measured along the $\xi$ axis, will reach a maximum value at the exact point at which the boring tool passes the locator in the described manner. This approach may be somewhat complex, however, when the movement of the boring tool is monitored in an incremental fashion since the flux will generally cross the maximum value at some point during an interval as opposed to at the precise moment corresponding to the end of one interval and the beginning of a successive interval. Moreover, the maximum of $b_\xi$ is not well defined (it is shallow) and, hence, quite difficult to locate even under continuous monitoring.

In another approach, the sign of the flux along the $\zeta$ axis may be monitored with respect to passing the boring tool. This approach is compatible with incremental movement monitoring since a comparison of the sign of the flux $b_\zeta$ only need be performed so as to indicate the boring tool having passed the locator. That is, a change in the flux sign indicates that the $\zeta$ axis was crossed at some point during the immediately preceding distance movement. Further monitoring of the $b_\zeta$ flux will then indicate any re-crossing of the $\zeta$ axis as another change in the sign of the flux. In this way, the position of the locator is monitored from one distance movement to the next until such time that the $b_\zeta$ flux changes sign. This event terminates the second sequence of distance movements, as the boring tool passes the locator.

During the second sequence of distance movements, the relative positional relationship is determined based on Row 2 of Table 2, indicating that $b_\zeta$ is greater than zero within region A1. It is noted that the convention adopted here wherein $b_\zeta > 0$ in tracking region A1 is employed for the purpose of descriptive clarity. Actual use of $b_\zeta$ requires only a comparative evaluation of the sign of this value which changes in sign upon the boring tool entering tracking region A2. The position of the locator relative to the boring tool is established in essentially the same manner as in tracking region F using $\tan \alpha = F_1$. Radial distance r is again determined using equation 9. Equations 7 and 8 are then used to determine the locator coordinates in the $\xi,\zeta$ plane.

Referring to Row 3 of Table 2, in the potential, but rather unlikely event that $b_\zeta=0$, the locator is positioned at a point along the $\zeta$ axis, $\alpha=+90°$, which is a point on the locate line. The radius r can be determined from equation 9 and, consequently, the coordinates of the locator will be known in the $\xi,\zeta$ plane. However, the locator position can not be obtained in the transmitter fixed coordinates since the rotation angle $\sigma$ is not defined for points on the locate line, as discussed earlier.

Row 4 of Table 2 corresponds to a third sequence of distance movements during which the boring tool incrementally moves the locator through tracking region A2. Following any distance movement in the third sequence, the of the $b_\zeta$ flux is ascertained and compared to the sign of this flux determined for the last-determined positional relationship so as to confirm that the locator remains in tracking region A2. Accordingly, per Table 2, the $b_\zeta$ flux sign corresponding to region A2 is less than zero where the flux sign $b_\zeta$ for region A1 was considered as being positive. The coordinates of the locator relative to the boring tool are determined using an angle $\gamma$ defined for computational purposes (also shown in Table 2), as:

$$\tan \gamma = F_1 \quad (11)$$

Angle $\alpha$ is then determined as:

$$\alpha = \gamma + 180° \quad (12)$$

Equation 9 is then used to determine radial distance r such that the position of the locator is known in polar coordinates. Equations 7 and 8 then give the position of the locator in the $\xi,\zeta$ plane. For each distance movement in the third sequence, the sign of flux $b_\zeta$ is verified to confirm that the locator remains in region A2. If the sign changes, the procedure of the second sequence is re-invoked. Generally, the boring tool continues moving forward such that the distance along the $\xi$ axis surpasses distance d entering tracking region R. Upon detection of this condition, the third sequence is terminated and a fourth sequence of distance movements is entered, as described immediately hereinafter.

During a fifth sequence of distance movements in which the locator is in tracking region R, determinations are made in accordance with Row 5 of Table 2. Specifically, a is determined in a manner consistent with that used in region A2. Unlike region A2, however, monitoring the sign of flux $b_\zeta$ is not necessary from one distance movement to the next since the boring tool is incapable of moving by an amount that is sufficient to pass the boring tool in the reverse direction in a single distance movement. Alternatively, tracking of the relative positional relationship with respect to the tracking regions proceeds by confirming from one distance movement to the next that the distance along the $\xi$ axis remains greater than d, the maximum movement value. In the event that the distance along the $\xi$ axis is determined to be less than d, the procedure in accordance with the fourth sequence of distance movements is re-invoked.

The positional tracking technique of the present invention provides for tracking the relative positional relationship present between the boring tool and the locator as the boring tool progresses along some underground path. While the movement of the boring tool was considered above as being along a generally straight path, it is to be understood that this constraint was imposed for descriptive purposes only. Operational use of this technique is in no way constrained to straight drill paths, as will be appreciated by those skilled in the art. At first blush, the advantages of the tracking technique of the present invention may not be fully apparent. In this regard, it is important to understand that a sweeping difference is provided over the prior art. In particular, the positional relationship is tracked irrespective of the boring tool passing the position of the locator. As discussed above, prior art techniques having been limited to directing the boring tool to the receiver itself or to a location directly there below. The tracking technique of the present invention virtually sweeps away all constraints as to a specified target position so long as the locator remains within range of the boring tool for purposes of receiving the dipole locating signal. With this being the only constraint, the target can be at any location including to the side of the locator and in front or behind the locator. These advantages will become still more apparent in the context of a discussion below wherein the tracking technique is employed in steering the boring tool to a specified target.

Using coordinates $\xi_R$ and $\zeta_R$ of the locator determined from equations 7 and 8, respectively, the locator receiving position is determined in transmitter fixed coordinates wherein:

$$x_{t_R} = \xi_R \quad (13)$$

$$y_{t_R} = -\zeta_R \sin \sigma \quad (14)$$

$$z_{t_R} = \zeta_R \cos \sigma \quad (15)$$

where $x_{t_R}, y_{t_R}, z_{t_R}$ represent the locator/receiver position in transmitter fixed coordinates. These transmitter fixed coordinates are transformed to global coordinates using:

$$\begin{Bmatrix} x_R \\ y_R \\ z_R \end{Bmatrix} = T_1^{-1} T_2^{-1} \begin{Bmatrix} x_{t_R} \\ y_{t_R} \\ z_{t_R} \end{Bmatrix} \quad (16)$$

in which $x_R, y_R, z_R$ represent the locator/receiver position in global coordinates and where $T_1^{-1}$ and $T_2^{-1}$ are inverse rotation matrices based on equations 2 and 3, respectively, given as:

$$T_1^{-1} = \begin{Bmatrix} \cos\beta & -\sin\beta & 0 \\ \sin\beta & \cos\beta & 0 \\ 0 & 0 & 1 \end{Bmatrix} \quad (17)$$

$$T_2^{-1} = \begin{Bmatrix} \cos\phi & 0 & -\sin\phi \\ 0 & 1 & 0 \\ \sin\phi & 0 & \cos\phi \end{Bmatrix} \quad (18)$$

Having established the position of the locator in the global coordinate system, the position of a target may be established within the global coordinate system for display and steering purposes. It should be appreciated, as described above, that the target position is essentially unconstrained so long as the locating signal, with the boring tool at the target position, will be receivable at the receiving position of the locator. In order to facilitate ease of use from the viewpoint of a system operator, the present invention provides for initial specification of the target location relative to the locator. That is, the operator specifies the target location in terms of offsets from the locator at its receiving position, for example, as $\Delta x$, $\Delta y$ and $\Delta z$ values. Such values are generally readily specifiable, for example, with only a minimal awareness of the actual orientation of the global coordinate system under the generally correct assumptions that the global x axis extends horizontally in the drilling direction, the global y axis is horizontally orthogonal thereto and, of course, the global z axis extends vertically upward.

The relative receiver coordinates ($\Delta x$, $\Delta y$, $\Delta z$) are added to the target coordinates specified by the user to obtain the target position in global coordinates:

$$x_T = \Delta x + x_R \quad (19)$$

$$y_T = \Delta y + y_R \quad (20)$$

$$z_T = \Delta z + z_R \quad (21)$$

Figure 7:
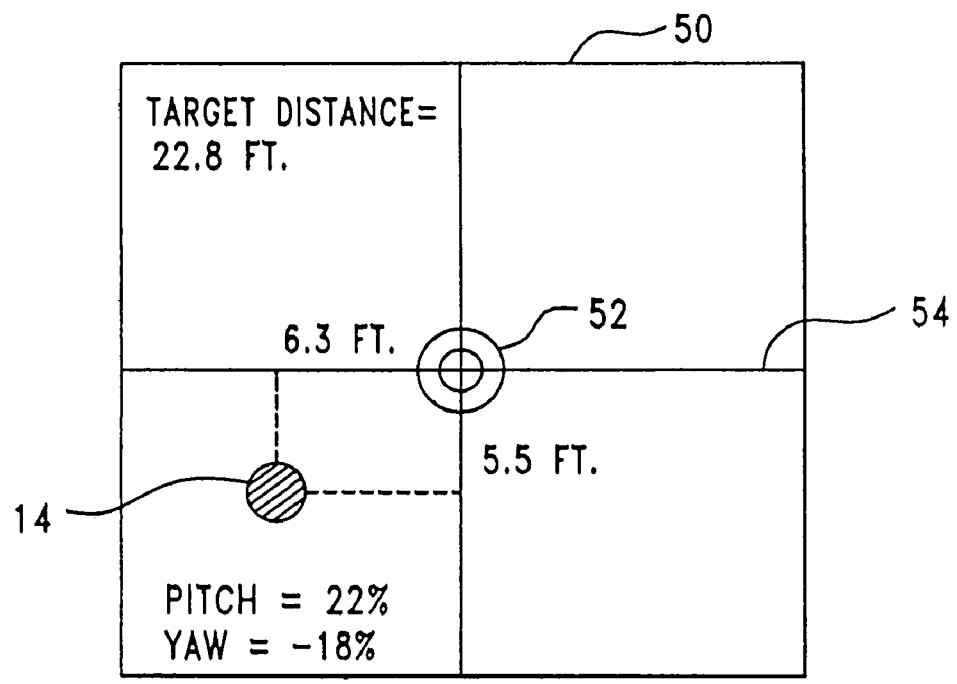
FIG. 7 is a diagrammatic illustration of a display showing a possible representation of a positional relationship between the boring tool and a target position determined in accordance with the highly advantageous tracking technique of the present invention.

FIG. 7 illustrates one possible appearance of a display 50, for example, presented on locator 16 including a target 52 centered in a pair of crosshairs 54. The display is presented as if the operator is looking in the forward direction from behind boring tool 14 such that it appears offset from target 52 in the global y (left/right) and z (up/down) directions. Exemplary y and z values are indicated as 6.3 feet and 5.5 feet, respectively, at appropriate points adjacent to the crosshairs. An exemplary forward distance to the boring tool is indicated in the upper left hand corner of display 50 as "Target distance=22.8 ft". Thus, distances to the target position are indicated along three axes. With regard to steering boring tool 14 to target 52, the use of display 50 is intuitive. As illustrated, the boring tool must be steered up and to the right in order to approach the target. In using the display of FIG. 7, steering is executed by the user in order to move the boring tool to the target. The user in issuing steering commands, therefore, must be sensitive to limitations of the drilling system such as, for example, the minimum bend radius of the drill string. Moreover, the user must also judge the feasibility of approaching the target at desired pitch and yaw angles based on the displayed offset values and current steering tool pitch and yaw data.

Prior to considering the generation of steering commands, attention is directed once again to FIG. 6 in order to consider the special cases in which locator 16 is either specified as the target or the boring tool moves away from the locator along a straight trajectory.

In these cases $b_{x_t} > 0$ and $b_{y_t} = b_{z_t} = 0$, or according to equations 5 and 6 $b_\xi > 0$ and $b_\zeta = 0$, so that the locator position in transmitter fixed coordinates is written as:

$$x_{t_R} = \pm (2/b_{x_t})^{1/3} \quad (22)$$

$$y_{t_r} = z_{t_r} = 0 \quad (23)$$

The plus sign is used in Equation 22 if locator 16 is ahead of the boring tool in either regions F or A1, otherwise the minus sign applies.

As described above, the present invention provides remarkable flexibility with regard to the position of the target. In particular, the target position may be anywhere so long as the receiver is able to pick up the dipole locating signal for tracking purposes upon the boring tool attaining the target position. It is also to be understood that this flexibility is accompanied by a further advantage with respect to the path taken by the boring tool. Specifically, by arranging the initial or first position of the boring tool at the start of drilling and the target location such that an intended path therebetween is within a dipole receiving range of the locator, the intended path of the boring tool may be seen to be longer than the dipole receiving range. The intended path, in this instance, is contemplated as being generally straight. In fact, when the locator is stationed near the intended path and spaced from the initial position of the boring tool by approximately the dipole receiving range along the drilling direction, the intended path is approximately twice the dipole receiving range. As compared to the prior art, the present invention has, therefore, approximately doubled the potential length of the intended path, with accuracy of measurement of fluxes emitted from a boring tool at the target generally increasing as the target is positioned closer to the locator, and accuracy of measurement of the locating signal at any given point generally increasing as the boring tool is closer to the locator.

Where the user specifies pitch, $\beta_T$, and yaw, $\phi_T$, at the target position, the present invention may provide further steering data including steering commands. As mentioned above with regard to FIG. 7, target pitch and yaw data are not required input if the user is only interested in boring tool position coordinates. In order to generate steering commands, the target position is first determined in transmitter fixed coordinates using:

$$\begin{Bmatrix} x_{t_T} \\ y_{t_T} \\ z_{t_T} \end{Bmatrix} = T_2 T_1 \begin{Bmatrix} x_T \\ y_T \\ z_T \end{Bmatrix} \quad (24)$$

where $x_{t_T}, y_{t_T}, z_{t_T}$ is the position of the target in transmitter fixed coordinates and $x_T, y_T, z_T$ is the position of the target in global coordinates. $T_1$ and $T_2$ are rotation matrices, as defined above. Locating signal fluxes at the target position and in transmitter fixed coordinates are derived from the dipole equations:

$$b_{x_t}|_T = \frac{3x_{t_T}^2 - r^2}{r^5} \quad (25)$$

$$b_{y_t}|_T = \frac{3x_{t_T} y_{t_T}}{r^5} \quad (26)$$

$$b_{z_t}|_T = \frac{3x_{t_T} z_{t_T}}{r^5}, \text{ and} \quad (27)$$

$$r^2 = x_T^2 + y_T^2 + z_T^2 \quad (28)$$

where flux components at the target, $b_{x_t}|_T, b_{y_t}|_T, b_{z_t}|_T$, in transmitter fixed coordinates are rotated to flux components at the target, $b_{x_T}, b_{y_T}, b_{z_T}$, in global coordinates using:

$$\begin{Bmatrix} b_{x_t} \\ b_{y_t} \\ b_{z_t} \end{Bmatrix} = T_1^{-1} T_2^{-1} \begin{Bmatrix} b_{x_t}|_T \\ b_{y_t}|_T \\ b_{z_t}|_T \end{Bmatrix} \quad (29)$$

Figure 8:
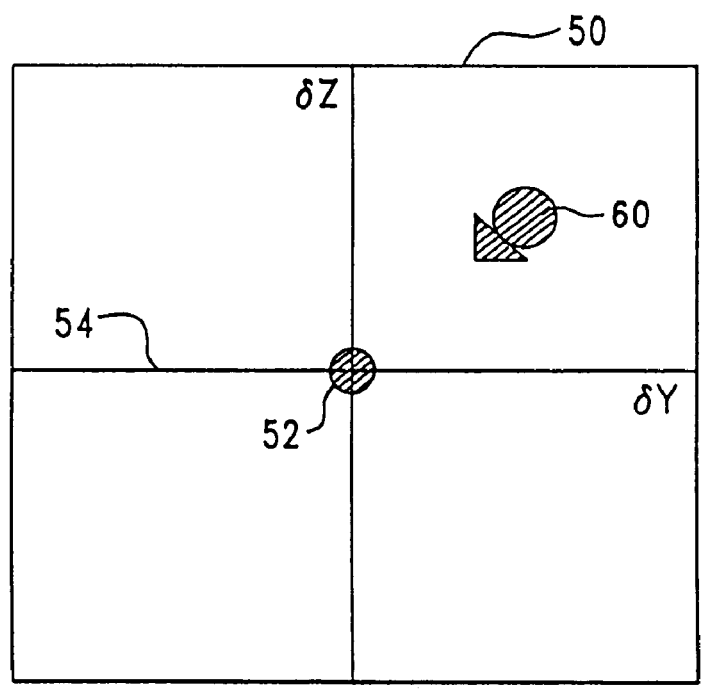
FIG. 8 is a diagrammatic illustration of another display illustrating steering commands produced in accordance with the present invention.

Referring to FIG. 8, steering commands are produced based on user specified pitch, $\beta_T$, and yaw, $\phi_T$, at the target position using:

$$\delta Y = -\tan\beta_T + \frac{b_{y_T}}{b_{x_T}} \quad (30)$$

$$\delta Z = \tan\phi_T - \frac{b_{z_T}}{b_{x_T}} \quad (31)$$

If $\delta Y > 0$, steering to the left is required whereas $\delta Y < 0$ requires steering to the right. If $\delta Z > 0$, downward steering is required whereas $\delta Z < 0$ requires upward steering. Such steering commands may be displayed to an operator or, alternatively, used by an automated steering system. Irrespective of how the commands are used, the generated commands may be produced to accommodate various system limitations including but not limited to drill string minimum bend radius. Steering commands may be displayed, for example, as illustrated by FIG. 8 including a steering indicator 60 shown offset from target 52 which indicates that steering downward and to the left is required. The axes related to the $\delta Y$ and $\delta Z$ steering commands are indicated adjacent to crosshairs 54 for reference.

Hence, where pitch, $\beta_T$, and yaw, $\phi_T$, at the target position are specified by the user, the present invention provides a complete steering solution. This solution is facilitated in cooperation with the highly advantageous, empirically based tracking technique of the present invention wherein the relative positional relationship between the boring tool and locator is monitored in a way which permits the specification of target positions anywhere within the drilling region. The primary limitation as to target position is that the receiver must be capable of receiving the locating signal when transmitted by the boring tool from the target position.

It should be understood that the steering commands generated by the present invention are determined in a mathematically coupled manner. That is, no assumptions are necessary with regard to $\delta Y$ (horizontal) steering in order to determine the $\delta Z$ (vertical) steering command and vice versa. While the steering commands determined by the technique of the '402 patent remain advantageous at least for the reason that a magnetometer is not required in the boring tool, its steering commands are determined in a mathematically uncoupled manner. Specifically, when calculating the left/right steering command, it is assumed that the boring tool is vertically aimed (i.e., pitched) at the target. Similarly, when calculating the up/down steering command, it is assumed that the boring tool is horizontally aimed (i.e., yawed) directly toward the target.

When drilling the steering tool to a specified target, pitch and yaw are measured along the drill path and the distance from the steering tool to the receiver is calculated as described. As will be seen, this information can be used to warn the driller of an over-steering situation that could cause drill rod and other equipment damage.

The approach is to repeatedly calculate changes of rod deflection angle and rod length during drilling. The ratio of these two parameters represents rod curvature that is compared with a specified threshold value considered sufficiently safe for the drill rod. The driller will be warned of imminent over-steering if the computed rod curvature exceeds the specified safe value. Other over-steering indicators such as rod-bending radius, defined as the inverse of curvature, or rod deflection angle can be used instead of curvature.

Having measured pitch and yaw at two neighboring steering tool positions along the drill path, labeled i−1 and i with i indicating the present position, pitch and yaw angle increments are calculated from:

$$\Delta\phi = \phi_i - \phi_{i-1} \quad (32)$$

$$\Delta\beta = \beta_i - \beta_{i-1} \quad (33)$$

Assuming moderately small pitch and yaw changes, a corresponding total rod deflection angle is obtained from:

$$\Delta\mu = \sqrt{(\Delta\phi)^2 + (\Delta\beta)^2} \quad (34)$$

Since the receiver position has already been established in global coordinates $(x_R, y_R, z_R)$, rod length ments between positions i−1 and i are determined using:

$$\Delta s = \sqrt{(x_{R_i} - x_{R_{i-1}})^2 + (y_{R_i} - y_{R_{i-1}})^2 + (z_{R_i} - z_{R_{i-1}})^2} \quad (35)$$

Assuming that the total rod deflection angle is given in radians, rod curvature becomes:

$$\kappa = \frac{\Delta \mu}{\Delta s} \quad (36)$$

A safe maximum value for curvature is obtained from:

$$\kappa_{max} = F \frac{1}{R_{min}} \quad (38)$$

Here, $R_{min}$ is the minimum recommended rod bend radius for the drill rod in use. The factor F is less than or equal to unity and represents an additional safety factor chosen by the driller. The driller will be warned of over-steering if $\kappa > \kappa_{max}$.

Several variations of this procedure can be implemented, all of which are considered as being within the capability of one having ordinary skill in the art in view of this overall disclosure. For instance, one could calculate separate rod curvatures from pitch and yaw angle changes and compare the larger of the two values with $\kappa_{max}$. In another variation, one could monitor rod bending radius $R=1/K$ and warn the driller if $R<R_{min}$. Furthermore, one could estimate the total rod bending angle for the whole length $l_{rod}$ of the drill rod using:

$$\Delta \mu_{rod} = \frac{l_{rod}}{\Delta s} \Delta \mu \quad (39)$$

and issue a warning if $\Delta \mu_{rod}$ exceeds a specified maximum total rod bending angle. This warning may be provided on any display screen available in the system such as, for example, on locator 16 and/or in an audible form.

Inasmuch as the arrangements and associated methods disclosed herein may be provided in a variety of different configurations and modified in an unlimited number of different ways, it should be understood that the present invention may be embodied in many other specific forms without departing from the spirit of scope of the invention. Therefore, the present examples and methods are to be considered as illustrative and not restrictive, and the invention is not to be limited to the details given herein, but may be modified within the scope of the appended claims.

What is claimed is:

1. In a system for tracking a boring tool within an underground region in which system the boring tool is configured for transmitting a dipole locating signal axially coincident with an elongation axis of the boring tool, a method comprising the steps of:

determining a starting positional relationship including the boring tool and a receiving position at which the dipole locating signal is to be monitored such that the receiving position is generally ahead of the boring tool;

moving the boring tool in a direction generally forward through the ground in a series of distance movements such that each distance movement is less than a maximum movement value;

for each distance movement making up a first sequence in said series of distance movements, using at least measured values of the locating signal taken at the receiving position to determine a forward distance from the boring tool to an orthogonal plane defined normal to the elongation axis and including the receiving position; and when, for a particular one of the first sequence of the distance movements, the forward distance is determined to be less than the maximum movement value, thereafter monitoring the dipole locating signal during a second sequence in the series of said distance movements in a predetermined way which detects a specific one of the distance movements concluding the second sequence of distance movements during which the boring tool crosses said plane.

2. The method of claim 1 further comprising the steps of:

for each distance movement in a third sequence of said distance movements, continuing to monitor the dipole locating signal in said predetermined way for another crossing of said plane and determining a rearward distance from the boring tool to said plane now located behind the boring tool; and when the rearward distance determined following one of the distance movements concluding the third sequence is greater than said maximum movement value, for each distance movement making up a fourth sequence of said series of distance movements, using at least measured values of the locating signal taken at the receiving position to confirm that the rearward distance is greater than said maximum movement value.

3. The method of claim 2 further comprising the steps of:

obtaining target coordinates toward which the boring tool is intended to be directed during said series of distance movements;

determining a relative positional relationship including the boring tool and the receiving position for each of said distance movements; and establishing a target position of the target coordinates relative to the boring tool as part of said relative positional relationship for each of said distance movements.

4. The method of claim 3 wherein the step of obtaining the target coordinates includes the step of accepting the target coordinates specified relative to the receiving position.

5. The method of claim 4 including the step of defining a global coordinate system in said region having an origin on the elongation axis of said boring tool corresponding to a point source of the dipole locating signal and having three orthogonally opposed axes, and the step of establishing the target position relative to the boring tool includes the step of using the target coordinates specified relative to the receiving position to determine the target position in global coordinates.

6. The method of claim 3 further comprising the step of:

displaying at least the target position and boring tool relative to one another for use in guiding the boring tool to the target position.

7. The method of claim 6 wherein said displaying step includes the step of showing the target and boring tool on a display screen having the boring tool offset from the target position as if viewed looking forward along the elongation axis of the boring tool.

8. The method of claim 3 wherein the dipole locating signal is receivable at the receiving position when the receiving position is within a dipole receiving range of the boring tool and wherein said target position is established up to approximately the dipole receiving range from the target position.

9. The method of claim 3 wherein the dipole locating signal is receivable at the receiving position when the receiving position is within a dipole receiving range of the boring tool, said method including the step of arranging the boring tool in the starting positional relationship and the target location such that an intended path of the boring tool is longer than said dipole receiving range.

10. The method of claim 1 wherein an axial plane is defined by the elongation axis of the boring tool and the receiving position and, during the second sequence of distance movements, the step of monitoring the dipole locating field in said predetermined way includes the step of determining flux components of the dipole locating signal in said axial plane to identify the boring tool having passed the receiving position with respect to said orthogonal plane.

11. The method of claim 10 wherein an orthogonal pair of axes $\xi$ and $\zeta$ are included in said axial plane such that the $\xi$ axis is coincident with the elongation axis of the boring tool and the $\zeta$ axis is normal thereto in said axial plane and where $b_\xi$ and $b_\zeta$ are components of the dipole locating field along the $\xi$ and $\zeta$ axes, respectively, said method including the step of monitoring $b_\zeta$ to identify the boring tool having passed the receiving position with respect to the elongation axis of the boring tool.

12. The method of claim 11 wherein the step of monitoring $b_\zeta$ detects the passage of the boring tool beyond the receiving position based on a change in the sign of $b_\zeta$.

13. The method of claim 11 wherein, during said second sequence of distance movements, said forward distance is determined, at least in part, using an angle $\alpha$ defined as:

$$\tan\alpha = \frac{\left(-3b_\xi + \sqrt{9b_\xi^2 + 8b_\zeta^2}\right)\text{sign}(b_\zeta)}{2|b_\zeta|},$$

and $$\frac{1}{r^3} = -\frac{1}{4}b_\xi + \sqrt{\frac{9}{16}b_\xi^2 + \frac{1}{2}b_\zeta^2}$$

where r is a radial distance between the boring tool and the receiving position.

14. The method of claim 1 wherein for each distance movement a third sequence of said distance movements after the boring tool crosses said orthogonal plane, continuing to monitor the dipole locating signal in said predetermined way for another crossing of said orthogonal plane while using measured values of the dipole locating signal and said certain orientation parameters to confirm that a rearward distance from the boring tool to said orthogonal plane now located behind the boring tool is less than the maximum movement value.

15. The method of claim 14 wherein an axial plane is defined by the elongation axis of the boring tool and the receiving position and an orthogonal pair of axes $\xi$ and $\zeta$ are included in said axial plane such that the $\xi$ axis is coincident with the elongation axis of the boring tool and the $\zeta$ axis is normal thereto in said axial plane and where $b_\xi$ and $b_\zeta$ are components of the dipole locating field along the $\xi$ and $\zeta$ axes, respectively, said method including the step of monitoring $b_\zeta$ in a way which identifies the boring tool having crossed the orthogonal plane.

16. The method of claim 15 wherein the step of monitoring $b_\zeta$ detects the passage of the boring tool across the orthogonal plane based on a change in the sign of $b_\zeta$.

17. The method of claim 15 wherein, during said third sequence, the rearward distance of the receiving position behind the boring tool is determined, at least in part, using an angle $\gamma$ defined as:

$$\tan(\gamma) = \frac{\left(-3b_\xi + \sqrt{9b_\xi^2 + 8b_\zeta^2}\right)\text{sign}(b_\zeta)}{2|b_\zeta|},$$

$\alpha = \gamma + 180°$, and $$\frac{1}{r^3} = -\frac{1}{4}b_\xi + \sqrt{\frac{9}{16}b_\xi^2 + \frac{1}{2}b_\zeta^2},$$

where angle $\alpha$ is defined between the elongation axis of the boring tool and a line extending from the boring tool to the receiving position and r is a radial distance between the boring tool and the receiving position.

18. The method of claim 14 wherein, after the rearward distance determined following one of the distance movements in the third sequence is greater than said maximum movement value, for each distance movement making up a fourth sequence of said distance movements, using at least measured values of the locating signal taken at the receiving position and said certain orientation parameters to confirm that the rearward distance remains greater than said maximum movement value.

19. The method of claim 18 wherein, during said fourth sequence the rearward distance of the receiving position behind the boring tool is determined, at least in part, using an angle $\gamma$ defined as:

$$\tan(\gamma) = \frac{\left(-3b_\xi + \sqrt{9b_\xi^2 + 8b_\zeta^2}\right)\text{sign}(b_\zeta)}{2|b_\zeta|},$$

$\alpha = \gamma + 180'$, and $$\frac{1}{r^3} = -\frac{1}{4}b_\xi + \sqrt{\frac{9}{16}b_\xi^2 + \frac{1}{2}b_\zeta^2},$$

where angle $\alpha$ is defined between the elongation axis of the boring tool and a line extending from the boring tool to the receiving position and r is a radial distance between the boring tool and the receiving position.

20. In a system for tracking a boring tool within an underground region in which system the boring tool is configured for transmitting a dipole locating signal axially coincident with an elongation axis of the boring tool, an apparatus comprising:

first means for determining a starting positional relationship including the boring tool and a receiving position at which the dipole locating signal is to be monitored such that the receiving position is generally ahead of the boring tool;

second means for moving the boring tool in a direction generally forward through the ground during a series of distance movements such that each distance movement is less than a maximum movement value;

third means for using at least measured values of the locating signal taken at the receiving position, for each distance movement making up a first sequence in said series of distance movements, to determine a forward distance from the boring tool to an orthogonal plane defined normal to the elongation axis and including the receiving position and for terminating the first sequence when, for a particular one of the distance movements in the first sequence, the forward distance is determined to be less than the maximum movement value; and fourth means for monitoring the dipole locating signal during a second sequence in the series of said distance movements in a predetermined way which detects a specific one of the distance movements concluding the second sequence during which the boring tool crosses said plane.

21. The apparatus of claim 20 further comprising:

fifth means for continuing to monitor the dipole locating signal in said predetermined way, corresponding to each distance movement in a third sequence of said distance movements for another crossing of said plane and for determining a rearward distance from the boring tool to said plane now located behind the boring tool and for terminating the third sequence when the rearward distance determined following one of the distance movements is greater than said maximum movement value; and sixth means for using at least measured values of the locating signal taken at the receiving position for each distance movement in a fourth sequence of said series of distance movements, to confirm that the rearward distance is greater than said maximum movement value.

22. The apparatus of claim 21 further comprising:

seventh means for (i) obtaining target coordinates toward which the boring tool is intended to be directed during said series of distance movements, (ii) determining a relative positional relationship including the boring tool and the receiving position for each of said distance movements, and (iii) establishing a target position of the target coordinates relative to the boring tool as part of said relative positional relationship for each of said distance movements.

23. The apparatus of claim 22 wherein said seventh means is configured for accepting the target coordinates specified relative to the receiving position.

24. The apparatus of claim 23 wherein said seventh arrangement is further configured for defining a global coordinate system in said region having an origin on the elongation axis of said boring tool corresponding to a point source of the dipole locating signal and having three orthogonally opposed axes, and for establishing the target position relative to the boring tool using the target coordinates specified relative to the receiving position to determine the target position in global coordinates.

25. The apparatus of claim 22 further comprising display means configured for displaying at least the target position and boring tool relative to one another for use in guiding the boring tool to the target position.

26. The apparatus of claim 25 wherein said display means is configured for showing the target and boring tool on a display screen having the boring tool offset from the target position as if viewed looking forward along the elongation axis of the boring tool.

27. The apparatus of claim 22 wherein the dipole locating signal is receivable at the receiving position when the receiving position is within a dipole receiving range of the boring tool and wherein said seventh arrangement is configured for using the target position established up to approximately the dipole receiving range from the target position.

28. The apparatus of claim 22 wherein the dipole locating signal is receivable at the receiving position when the receiving position is within a dipole receiving range of the boring tool and wherein said first means and said seventh means are configured for cooperatively establishing the starting positional relationship and the target position, respectively, such that an intended path of the boring tool is longer than said dipole receiving range.

29. The apparatus of claim 20 wherein an axial plane is defined by the elongation axis of the boring tool and the receiving position and said fourth means is configured for monitoring the dipole locating field in said predetermined way during the second sequence of distance movements, at least in part, by determining flux components of the dipole locating signal in said axial plane to identify the boring tool having passed the receiving position with respect to said orthogonal plane.

30. The apparatus of claim 29 wherein an orthogonal pair of axes $\xi$ and $\zeta$ are included in said axial plane such that the $\xi$ axis is coincident with the elongation axis of the boring tool and the $\zeta$ axis is normal thereto in said axial plane and where $b_\xi$ and $b_\zeta$ are components of the dipole locating field along the $\xi$ and $\zeta$ axes, respectively, wherein said fourth means monitors $b_\zeta$ to identify the boring tool having passed the receiving position with respect to the elongation axis of the boring tool.

31. The apparatus of claim 30 wherein said fourth means detects the passage of the boring tool beyond the receiving position based on a change in the sign of $b_\zeta$.

32. The apparatus of claim 30 wherein said fourth means is configured for determining said forward distance, during said second sequence of distance movements, using an angle $\alpha$ defined as:

$$\tan\alpha = \frac{\left(-3b_\xi + \sqrt{9b_\xi^2 + 8b_\zeta^2}\right)\mathrm{sign}(b_\zeta)}{2|b_\zeta|},$$

and $$\frac{1}{r^3} = -\frac{1}{4}b_\xi + \sqrt{\frac{9}{16}b_\xi^2 + \frac{1}{2}b_\zeta^2}$$

where r is a radial distance between the boring tool and the receiving position.

33. The apparatus of claim 20 including fifth means for continuing to monitor the dipole locating signal in said predetermined way, for each distance movement in a third sequence of said distance movements after the boring tool crosses said orthogonal plane, to detect any potential crossing of said orthogonal plane using measured values of the dipole locating signal and said certain orientation parameters and to confirm that a rearward distance from the boring tool to said orthogonal plane, now located behind the boring tool, is less than the maximum movement value and for terminating the third sequence when the rearward distance is greater than the maximum movement value.

34. The apparatus of claim 33 wherein an axial plane is defined by the elongation axis of the boring tool and the receiving position and an orthogonal pair of axes $\xi$ and $\zeta$ are included in said axial plane such that the $\xi$ axis is coincident with the elongation axis of the boring tool and the $\zeta$ axis is normal thereto in said axial plane and where $b_\xi$ and $b_\zeta$ are components of the dipole locating field along the $\xi$ and $\zeta$ axes, respectively, said fifth means is configured for monitoring $b_\zeta$ in a way which identifies the boring tool having crossed the orthogonal plane.

35. The apparatus of claim 34 wherein said fifth means detects the passage of the boring tool across the orthogonal plane based on a change in the sign of $b_\zeta$.

36. The apparatus of claim 34 wherein, during said third sequence, the rearward distance of the receiving position behind the boring tool is determined by said fifth means, at least in part, using an angle $\gamma$ defined as:

$$\tan(\gamma) = \frac{\left(-3b_\xi + \sqrt{9b_\xi^2 + 8b_\zeta^2}\right)\text{sign}(b_\zeta)}{2|b_\zeta|},$$

$\alpha = \gamma + 180°$, and $$\frac{1}{r^3} = -\frac{1}{4}b_\xi + \sqrt{\frac{9}{16}b_\xi^2 + \frac{1}{2}b_\zeta^2},$$

where angle $\alpha$ is defined between the elongation axis of the boring tool and a line extending from the boring tool to the receiving position and r is a radial distance between the boring tool and the receiving position.

37. The apparatus of claim 33 further comprising fifth means for executing a fourth sequence of the distance movements using at least measured values of the locating signal taken at the receiving position and said certain orientation parameters to confirm that the rearward distance remains greater than said maximum movement value.

38. The apparatus of claim 37 wherein, during said fourth sequence, the rearward distance of the receiving position behind the boring tool is determined by said fifth means, at least in part, using an angle $\gamma$ defined as:

$$\tan(\gamma) = \frac{\left(-3b_\xi + \sqrt{9b_\xi^2 + 8b_\zeta^2}\right)\text{sign}(b_\zeta)}{2|b_\zeta|},$$

$\alpha = \gamma + 180'$, and $$\frac{1}{r^3} = -\frac{1}{4}b_\xi + \sqrt{\frac{9}{16}b_\xi^2 + \frac{1}{2}b_\zeta^2},$$

where angle $\alpha$ is defined between the elongation axis of the boring tool and a line extending from the boring tool to the receiving position and r is a radial distance between the boring tool and the receiving position.

* * * * *